United States Patent
Kato et al.

(10) Patent No.: US 10,636,613 B2
(45) Date of Patent: Apr. 28, 2020

(54) X-RAY TUBE, X-RAY TUBE DEVICE, AND METHOD OF MANUFACTURING X-RAY TUBE DEVICE

(71) Applicant: Canon Electron Tubes & Devices Co., Ltd., Otawara-shi (JP)

(72) Inventors: Takeshi Kato, Nasushiobara (JP); Takanobu Hara, Nasushiobara (JP); Masayoshi Miyamura, Otawara (JP)

(73) Assignee: Canon Electron Tubes & Devices Co., Ltd., Otawara-shi (JP)

( * ) Notice: Subject to any disclaimer, the term of this patent is extended or adjusted under 35 U.S.C. 154(b) by 284 days.

(21) Appl. No.: 15/891,997

(22) Filed: Feb. 8, 2018

(65) Prior Publication Data

US 2018/0182592 A1 Jun. 28, 2018

Related U.S. Application Data

(63) Continuation of application No. PCT/JP2016/061121, filed on Apr. 5, 2016.

(30) Foreign Application Priority Data

Aug. 10, 2015 (JP) .................................. 2015-158107

(51) Int. Cl.
*H01J 35/10* (2006.01)
*H01J 35/16* (2006.01)
(Continued)

(52) U.S. Cl.
CPC ........ *H01J 35/16* (2013.01); *B29C 45/14336* (2013.01); *B29C 45/14639* (2013.01);
(Continued)

(58) Field of Classification Search
CPC ........ H01J 35/16; H01J 35/106; H01J 35/101; H01J 35/06; H01J 35/14; H01J 35/08;
(Continued)

(56) References Cited

U.S. PATENT DOCUMENTS 2,703,373 A 3/1955 Cummings
2,890,358 A 6/1959 Cummings
(Continued)

FOREIGN PATENT DOCUMENTS

CN 1618258 A 5/2005
CN 1925099 A 3/2007
(Continued)

OTHER PUBLICATIONS

Extended European Search Report dated Mar. 14, 2019 in Patent Application No. 16834837.3, 10 pages.
(Continued)

*Primary Examiner* — Don K Wong
(74) *Attorney, Agent, or Firm* — Oblon, McClelland, Maier & Neustadt, L.L.P.

(57) ABSTRACT

According to one embodiment, an X-ray tube comprises a cathode for emitting electrons, an anode having an anode target with which electrons emitted from the cathode collides to radiate X-rays, a glass container housing the cathode and the anode, an anode rod extending from the anode to an outside of the container, an annular metal member through which the anode rod is inserted, the annular metal member connecting the anode and the container to maintain an inside of the container in vacuum, and an electrically insulating molding resin member charged into a space formed between the anode rod and outer surfaces of the container and the metal member.

18 Claims, 5 Drawing Sheets

(51) Int. Cl.
*H05G 1/02* (2006.01)
*H05G 1/06* (2006.01)
*B29C 45/14* (2006.01)
*B29K 83/00* (2006.01)

(52) U.S. Cl.
CPC .............. *H05G 1/025* (2013.01); *H05G 1/06* (2013.01); *B29K 2083/00* (2013.01); *B29K 2995/0005* (2013.01); *B29K 2995/0007* (2013.01); *H01J 2235/16* (2013.01)

(58) Field of Classification Search
CPC ............ H01J 35/165; H01J 2237/1006; H01J 2237/00; H01J 2235/1216; H01J 2893/00; B29K 2083/00; B29C 45/14639; B29C 45/14336
See application file for complete search history.

(56) References Cited

U.S. PATENT DOCUMENTS

| | | | |
|---|---|---|---|
| 2,909,664 A | 10/1959 | Zunick et al. | |
| 4,943,989 A * | 7/1990 | Lounsberry | H01J 35/105 378/127 |
| 7,496,178 B2 | 2/2009 | Turner | |
| 7,519,159 B2 | 4/2009 | Radley et al. | |
| 2004/0218725 A1 | 11/2004 | Radley et al. | |
| 2006/0193439 A1 | 8/2006 | Anno et al. | |

FOREIGN PATENT DOCUMENTS

| | | |
|---|---|---|
| JP | 2005-228696 | 8/2005 |
| JP | 2009-117083 A | 5/2009 |
| JP | 2012-201106 | 10/2012 |
| JP | 2013-175355 A | 9/2013 |
| JP | 2015-216041 | 12/2015 |
| JP | 2015-230754 | 12/2015 |
| JP | 2015-232944 | 12/2015 |
| WO | WO 03/049138 A2 | 6/2003 |
| WO | WO 2005/038852 A1 | 4/2005 |

OTHER PUBLICATIONS

Combined Chinese Office Action and Search Report dated Feb. 1, 2019, in Patent Application No. 201680046789.1 (with English translation), 21 pages.
International Search Report dated Jun. 14, 2016 in PCT/JP2016/061121, filed on Apr. 5, 2016 (with English Translation).
Written Opinion dated Jun. 14, 2016 in PCT/JP2016/061121, filed on Apr. 5, 2016.

* cited by examiner

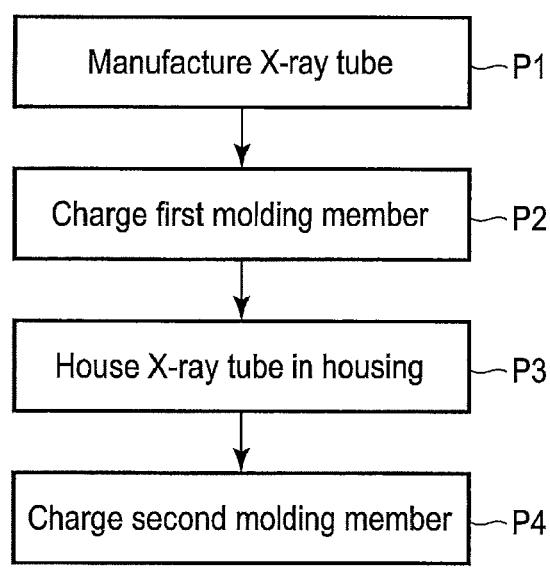
F I G. 2

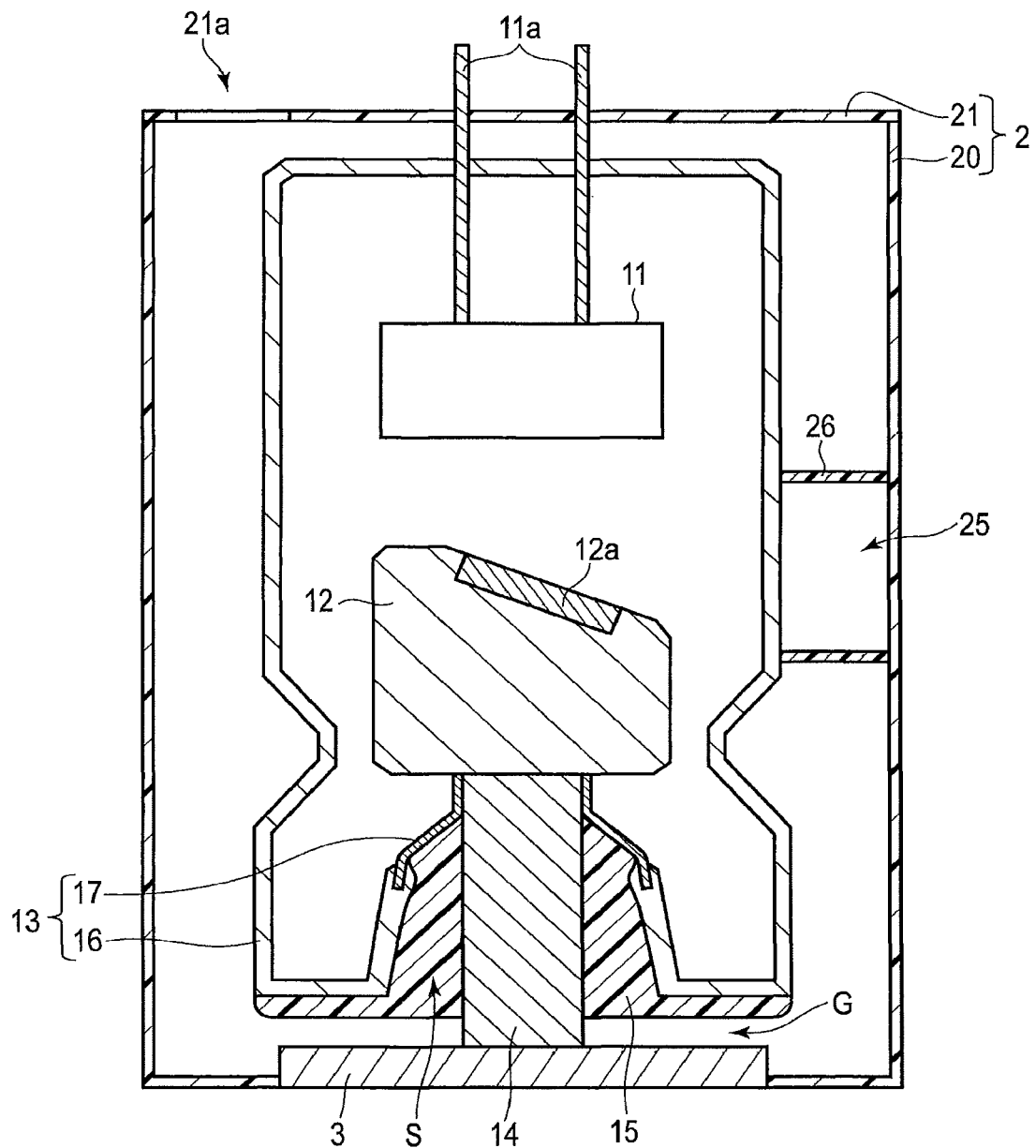
F I G. 4

X-RAY TUBE, X-RAY TUBE DEVICE, AND METHOD OF MANUFACTURING X-RAY TUBE DEVICE

CROSS-REFERENCE TO RELATED APPLICATIONS

This application is a Continuation Application of PCT Application No. PCT/JP2016/061121, filed Apr. 5, 2016 and based upon and claiming the benefit of priority from Japanese Patent Application No. 2015-158107, filed Aug. 10, 2015, the entire contents of all of which are incorporated herein by reference.

FIELD

Embodiments described herein relate generally to an X-ray tube, an X-ray tube device, and a method of manufacturing the X-ray tube device.

BACKGROUND

Generally, X-ray tubes are used for medical use, dental use or the like as X-ray diagnosis. In this type of X-ray tube, a cathode and an anode made of copper are disposed in a vacuum envelope such that they face each other. An anode is provided with an anode rod, which extends out of the vacuum envelope. When a high voltage is applied between the cathode and the anode, the electron emission source of the cathode emits electrons. These electrons collide with the anode target, from which X-rays are radiated. Heat generated in the anode along with the X-ray radiation is released to the outside of the vacuum envelope via the anode rod.

The difference between the thermal expansion coefficient of copper forming the anode and the thermal expansion coefficient of the glass forming part of the vacuum envelope is large. For this reason, in a case where the vacuum envelope is formed, not only glass but also a metal such as Kovar (KOV) having a thermal expansion coefficient substantially equal to that of glass are used. In other word, the vacuum envelope includes a glass container and a metal member. The metal member is, for example, annular and is used as a joint between the glass container and the anode.

Heat transmitted through the anode rod is transferred to, for example, a molding material or the like covering surroundings of the X-ray tube. Further, for the purpose of effectively cooling the anode, it is also conceivable to attach a radiator having a diameter larger than that of the columnar anode rod.

For example, as the above-mentioned molding material, in order to improve the thermal conductivity, it is possible to use a material in which fine particles of inorganic substance are mixed in silicone. Further, it is also possible to use as a molding material a mixture of inorganic fine particles composed of substances such as lead, tungsten, tantalum, bismuth, barium and the like having a large number of molecules in silicone. In this case, the X-ray shielding function can be imparted to the molding material.

As described above, for the purpose of imparting the thermal conductivity and the X-ray shielding function to the molding material, in a case where fine particles of inorganic substance are mixed in a resin material such as silicone in order to improve thermal conductivity and X-ray shielding performance, the thermal expansion coefficient of the molding material is more or less smaller than the thermal expansion coefficient of the silicone alone. The thermal expansion coefficient of the silicone alone is $270 \times 10^{-6}/K$. In a case where fine particles are mixed, the thermal expansion coefficient is about 200 to $270 \times 10^{-6}/K$. On the other hand, the thermal expansion coefficient of copper constituting the anode (anode rod) is $16.5 \times 10^{-6}/K$.

For example, the anode rod is fixed to the housing, and the molding material is charged into the housing. In order to cure the molding material, it is necessary to heat the molding material charged into the housing and before curing to a high temperature. At that time, the anode rod and the molding material expand with their thermal expansion coefficients, and the molding material cures in the expanded state. As members of the X-ray tube shrinks at a different shrinkage percentage at the time of subsequent cooling, the molding material generates stress acting on the X-ray tube. This stress is alleviated as the temperature rises during use of the X-ray tube, but it occurs again when the X-ray tube is cooled. In addition, stress may also be generated by volume shrinkage accompanying curing of the molding material. This volume shrinkage increases as the amount of volatile diluent added to the resin of the molding material increases.

When this stress concentrates in the vicinity of the metal member connecting the X-ray tube and the glass container, breakage of the glass container, and separation between the metal member and the glass container occur, and the vacuum airtightness of the X-ray tube may not be maintained.

BRIEF DESCRIPTION OF THE DRAWINGS

FIG. 2 is a view showing a flow of a method of manufacturing the X-ray tube device according to the first embodiment.

FIG. 4 is a view of an X-ray tube disposed inside the housing of the X-ray tube device in the process of manufacturing the X-ray tube device.

DETAILED DESCRIPTION

In general, according to an embodiment, an X-ray tube comprises: a cathode for emitting electrons; an anode having an anode target with which electrons emitted from the cathode collides to radiate X-rays; a glass container housing the cathode and the anode; an anode rod extending from the anode to an outside of the glass container; an annular metal member through which the anode rod is inserted, the annular metal member connecting the anode and the glass container to maintain an inside of the glass container in vacuum; and an electrically insulating molding resin member charged into a space formed between the anode rod and outer surfaces of the glass container and the metal member.

According to an embodiment, an X-ray tube device comprises: the X-ray tube; a fixing member attached to an end portion of the anode rod located outside the glass container and having a fixing surface forming a gap between the fixing member and the first molding resin member; and an electrically insulating second molding resin member which covers the X-ray tube and fills the gap between the first molding resin member and the fixing surface.

According to an embodiment, a method of manufacturing an X-ray tube device comprises: charging an electrically insulating first molding resin member into a space formed between the anode rod and outer surfaces of the glass container and the metal member; attaching an end of the anode rod located outside the glass container to the fixing surface so that a gap is formed between the fixing surface of the fixing member and the first molding resin member; accommodating the X-ray tube in a housing; and charging an electrically insulating second molding resin member into the housing, covering the X-ray tube with the second molding resin member, and filling the gap between the first molding resin member and the fixing surface with the second molding resin member.

According to the embodiments, it is possible to obtain an X-ray tube, an X-ray tube device and a method of manufacturing the X-ray tube device which can prevent breakage of the vacuum envelope.

Hereinafter, an X-ray tube, an X-ray tube device, and a method of manufacturing the X-ray tube device according to each embodiment will be described with reference to the drawings.

First Embodiment

Figure 1:
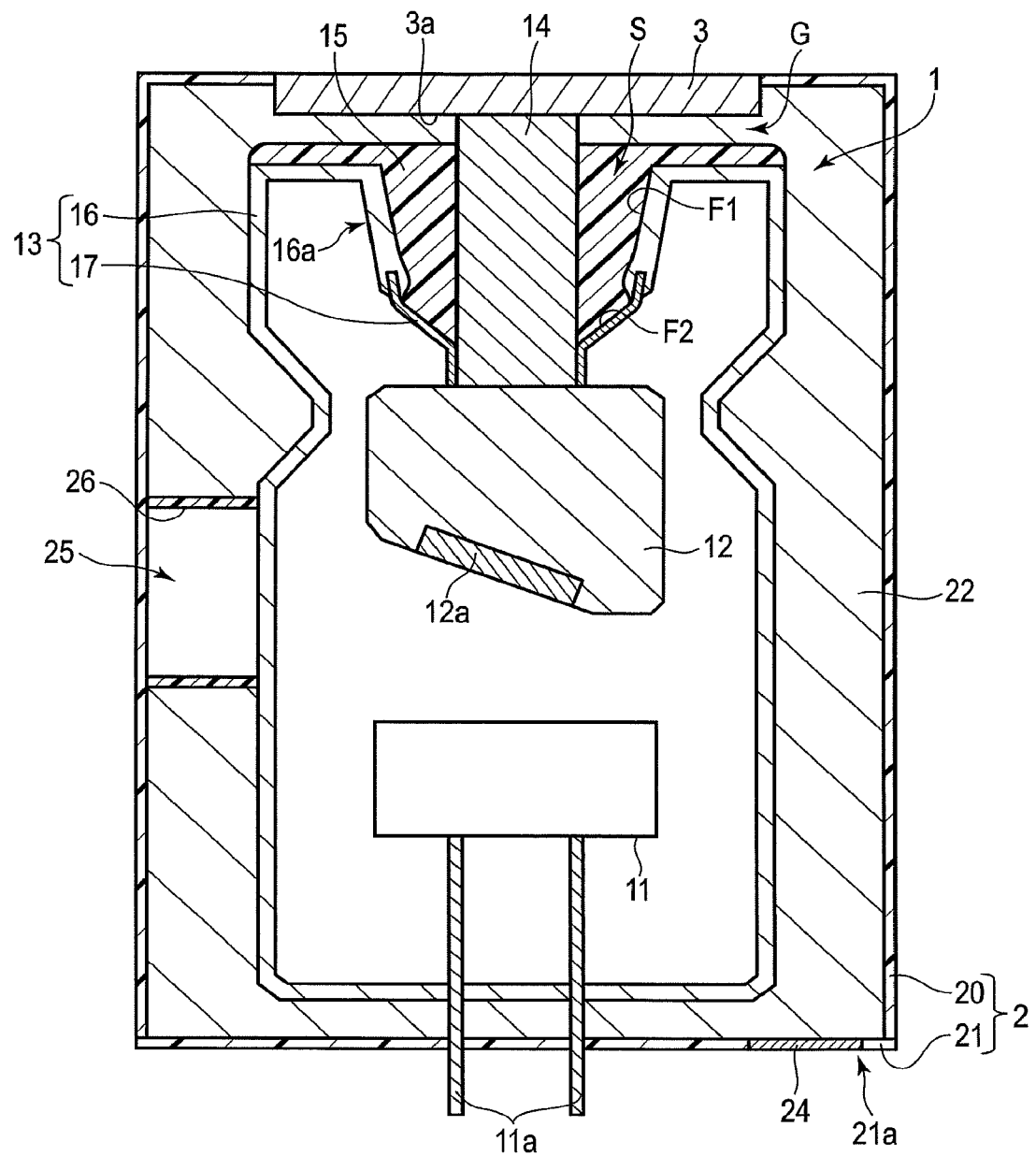
FIG. 1 is a cross-sectional view showing a schematic structure of an X-ray tube device according to a first embodiment.

FIG. 1 is a cross-sectional view showing a schematic structure of the X-ray tube device according to a first embodiment. This X-ray tube device, which is a fixed anode type X-ray tube device, includes an X-ray tube 1, a housing 2, and a fixing member 3.

The X-ray tube 1 includes a cathode 11, an anode 12, a vacuum envelope 13, an anode rod 14 (anode extending portion), and a first molding resin member 15. The cathode 11 includes a filament (electron emission source) that emits electrons, a focusing electrode, and a terminal 11a. In the present embodiment, for example, a negative high voltage and a filament current are applied to the filament via the terminal 11a. A negative high voltage is applied to the focusing electrode via a terminal (not shown).

The anode 12 includes an anode target 12a on the surface facing the cathode 11. The anode target 12a is formed of a high melting metal such as tungsten (W) or molybdenum (Mo), for example. The anode rod 14 is formed in a cylindrical shape, for example, with its one end fixed to the anode 12. In the present embodiment, the anode 12 and the anode rod 14 are formed of copper having excellent thermal conductivity. The anode 12 and the anode rod 14 may be formed of copper alloy or other metals having excellent thermal conductivity.

In the present embodiment, a high voltage is applied to the anode 12. On the other hand, the cathode 11 is grounded. The anode target 12a radiates X-rays when electrons emitted from the filament and focused by the focusing electrode collide with the anode target 12a.

The vacuum envelope 13 houses the cathode 11 and the anode 12. The inside of the vacuum envelope 13 is a vacuum. The vacuum envelope 13 includes a glass container 16 and a metal member 17 (metal container). The glass container 16 is formed of, for example, borosilicate glass. Since the glass container 16 has radiolucency, X-rays from the anode target 12a transmits the glass container 16 and are radiated to the outside of the vacuum envelope 13.

The anode rod 14 extends to the outside of the vacuum envelope 13. The glass container 16 has a recessed portion 16a that is recessed toward the anode 12 so as to surround the anode rod 14. One surface of the recessed portion 16a on the anode 12 side is open. The metal member 17 is formed in an annular shape through which the anode rod 14 passes. The metal member 17 is hermetically connected to at least one of the anode 12 and the anode rod 14 by brazing or the like. Further, the metal member 17 is hermetically connected to the glass container 16 by welding or the like. The opening of the recessed portion 16a is closed by the metal member 17, and the inside of the glass container 16 is maintained in vacuum. The metal member 17 is formed of a metal material having a thermal expansion coefficient approximately equal to that of the glass container 16, for example, Kovar.

An annular space S is formed between the outer surface F1 of the glass container 16 in the recessed portion 16a and the outer surface F2 of the metal member 17, and the anode rod 14. The outer surfaces F1 and F2 are surfaces opposite to the interior of the vacuum envelope 13 which is maintained in vacuum. This space S is filled with the first molding resin member 15. Further, in the example of FIG. 1, the first molding resin member 15 overflows the space S and extends on the outer surface of the glass container 16 around the recessed portion 16a.

One end face of the anode rod 14 extending outside of the vacuum envelope 13 is fixed to a fixing surface 3a of the fixing member 3. For example, the end face of the anode rod 14 and the fixing surface 3a can be fixed by screw. In this case, for example, the outer surface of the anode rod 14 may be threaded to form a male thread, and the female thread corresponding to the male thread may be formed in the fixing member 3, and they may be screwed together. Further, a female screw may be formed on the anode rod 14 and a through hole may be formed in the fixing member 3, and the anode rod 14 and the fixing member 3 may be fixed by a stud bolt.

The fixing member 3 is formed in, for example, a disk shape. The diameter of the fixing member 3 (or the fixing surface 3a) is larger than that of the anode rod 14. The fixing member 3 is made of a material such as ceramic having electrical insulation and high thermal conductivity. Such a material includes aluminum nitride, beryllium oxide, diamond like carbon, or the like.

The fixing surface 3a of the fixing member 3 and the first molding resin member 15 faces each other, and a gap G is formed therebetween. In other words, in the present embodiment, the first molding resin member 15 is not in contact with the fixing surface 3a. The gap G may be constant at each position of the fixing surface 3a or may vary.

The housing 2 includes a main body 20 and a lid 21. The main body 20 is formed in a bottomed cylindrical shape and houses the X-ray tube 1. In the example of FIG. 1, a hole is provided in the bottom wall (upper wall in the figure) of the main body 20, and the fixing member 3 is disposed so as to close the hole. The fixing member 3 is fixed to the main body 20. The lid 21 closes an opening on the side opposite to the side to which the fixing member 3 is fixed with respect to the main body 20 (the lower side in the figure).

The main body 20 and the lid 21 are made of resin, for example. The main body 20 and the lid 21 can also be made of a metal with radiolucency or a metal with X-ray shielding function. In the latter case, a window for emitting X-rays outside of the housing 2 may be provided in the main body 20.

The inside of the housing 2 is filled with a second molding resin member 22 covering the X-ray tube 1. Spaces between the X-ray tube 1 and the housing 2 and between the X-ray tube 1 and the fixing member 3 are filled with the second molding resin member 22. The gap G is filled with the second molding resin member 22. In the example of FIG. 1, the lid 21 has an injection port 21a for injecting the second molding resin member 22. After the injection of the second molding resin member 22, the injection port 21a is closed by a small lid 24. The injection port 21a may be opened without the small lid 24.

The first molding resin member 15 and the second molding resin member 22 are formed of a resin material having rubber elasticity and electrical insulation properties. The first molding resin member 15 and the second molding resin member 22 can be made of, for example, a resin containing the same silicone resin as a main component. However, the main component of the first molding resin member 15 and the second molding resin member 22 may be other types of resins. However, the main component of the first molding resin member 15 and the second molding resin member 22 may be different from each other.

Fine particles having a higher thermal conductivity than the silicone resin, or fine particles having an X-ray shielding function may be mixed in at least one of the first molding resin member 15 and the second molding resin member 22. For example, mixing fine particles of lead, tungsten, tantalum, bismuth, barium or the like can provide the first molding resin member 15 and the second molding resin member 22 with the X-ray shielding function.

In a case where the X-ray shielding function is imparted to the second molding resin member 22, a window 25 may be provided as shown in FIG. 1. The window 25 is surrounded by a partition wall 26 provided between the main body 20 of the housing 2 and the glass container 16 of the X-ray tube 1, and the second molding resin member 22 is not disposed in the window 25. X-rays from the anode 12 are emitted to the outside of the housing 2 through the window 25. The partition wall 26 can be formed of, for example, resin having electrical insulation properties.

In the X-ray tube device configured as described above, the electron beam collides with the anode target 12a, and the anode target 12a generates X-rays. The X-rays transmits the vacuum envelope 13 and the housing 2 and is radiated to the outside of the housing 2. Heat generated in the anode target 12a is transferred to the main body of the anode 12 and the anode rod 14, and is released to the outside of the X-ray tube 1. In the present embodiment, this heat is released to the outside of the X-ray tube device via the fixing member 3. A radiator may be attached to the fixing member 3 to increase the heat dissipation performance.

Figure 3:
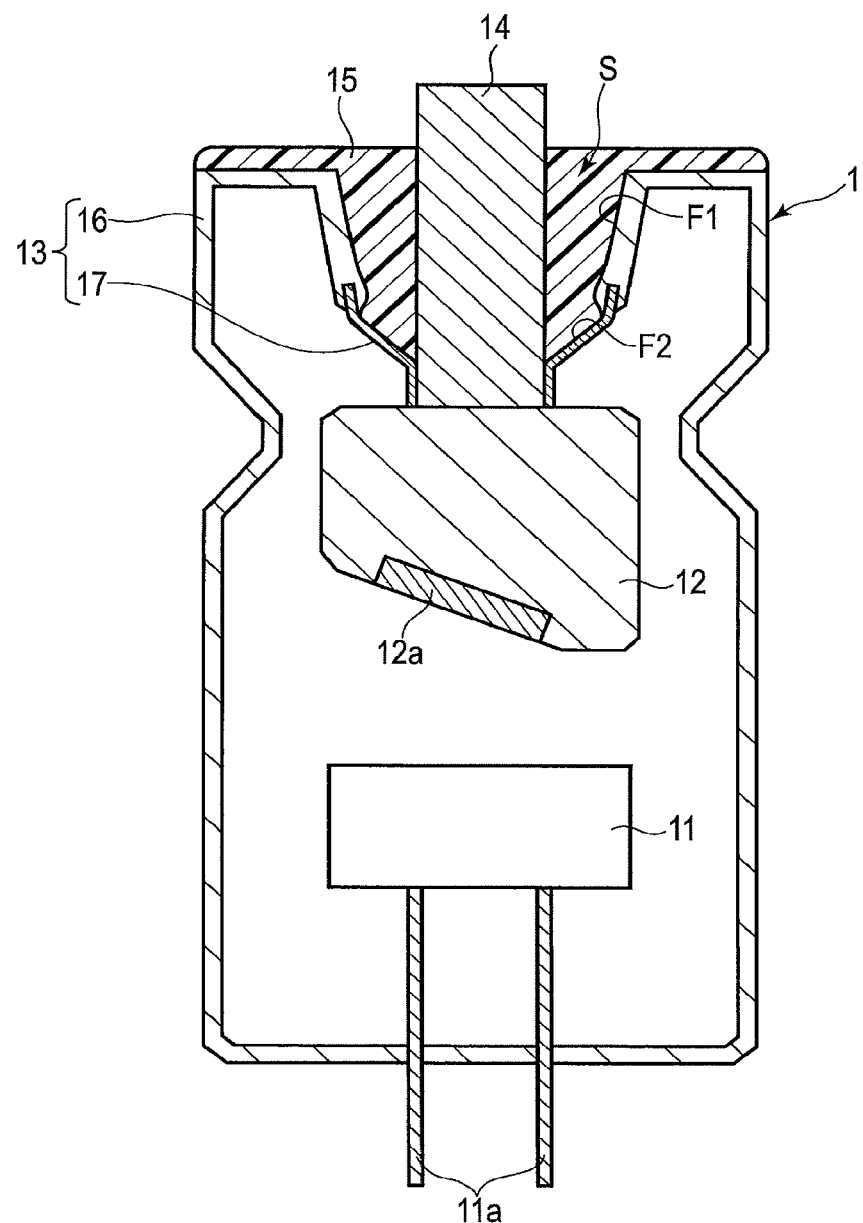
FIG. 3 is a view of an X-ray tube where a first molding resin member is formed in the process of manufacturing the X-ray tube device.

Next, a method of manufacturing the X-ray tube device will be described with reference to FIGS. 2 to 4.

FIG. 2 is a view showing a flow of a method of manufacturing the X-ray tube device according to the present embodiment. First, the X-ray tube 1 is manufactured (prepared) (step P1). At this time, the first molding resin member 15 is not formed on the X-ray tube 1. In addition, the fixing member 3 and the housing 2 are manufactured (prepared).

Subsequently, the space S between the outer surfaces F1 and F2 of the glass container 16 and the metal member 17, and the anode rod 14 is filled with a gel-like resin serving as the base of the first molding resin member 15 (step P2). This resin is also disposed on the outer surface of the glass container 16 around the recessed portion 16a. This gel-like resin is, for example, a thermosetting type, and is cured through a subsequent heating step. Thereby, as shown in FIG. 3, the X-ray tube 1 including the first molding resin member 15 is manufactured. Curing of the resin may be performed in a vacuum chamber. This prevents air bubbles from being mixed in the resin, which in turn improves the insulating property of the first molding resin member 15 and prevents partial discharge and the like due to the mixing of air bubbles.

After step P2, the X-ray tube 1 is housed in the housing 2 (step P3). In other words, the fixing member 3 is attached to the main body 20 of the housing 2, the anode rod 14 of the X-ray tube 1 is fixed to the fixing member 3, and the main body 20 is closed by the lid 21.

After step P3, as shown in FIG. 4, in a state where the injection port 21a stands upward in the direction of gravity, the form of gel as the base of the second molding resin member 22 is charged into the housing 2 through the injection port 21a (step P4). The space surrounded by the X-ray tube 1, the housing 2, and the fixing member 3 is filled with this resin. However, the space enclosed by the partition wall 26 is not filled.

Thereafter, the resin charged into the housing 2 is heated to be cured, and the injection port 21a is closed with the small lid 24. Thereby, as shown in FIG. 1, the X-ray tube device including the second molding resin member 22 is manufactured. The X-ray tube 1, the housing 2, and the fixing member 3 are adhered by the second molding resin member 22. As in the case of the first molding resin member 15, curing of the resin may be performed in the vacuum chamber. This prevents air bubbles from being mixed in the second molding resin member 22, which improves the insulating property of the second molding resin member 22 and prevents partial discharge and the like due to the mixing of air bubbles.

Note that lowering the viscosity by adding a volatile diluent to the resin to be charged in steps P2 and P4 can improve work efficiency of the filling. For example, when a diluent is added by 20% or more at a ratio of the weight of the diluent to the weight of the resin and the diluent, the work efficiency is sufficiently improved, and when the diluent in an amount of 50% or more is added, the work efficiency is extremely good. In particular, by adding a sufficient amount of diluent to the resin to be charged in step P4, the second molding resin member 22 can uniformly fill the gap G between the fixing surface 3a of the fixing member 3 and the first molding resin member 15.

In the heating step for curing the resin that has been charged in step P4, each member of the X-ray tube 1 such as the anode rod 14 and the resin expands with a specific thermal expansion coefficient, and the resin is cured in the expanded state. As each member of the X-ray tube 1 shrinks at a different shrinkage percentage at the time of subsequent cooling, the second molding resin member 22 can generate stress acting on the X-ray tube 1. In addition, stress may also be generated by volume shrinkage accompanying curing of the resin by the heating step. This volume shrinkage increases as the amount of diluent added to the resin increases. If such stress concentrates on the connecting portion between the glass container 16 and the metal member 17, breakage of the glass container 16 and separation between the glass container 16 and the metal member 17 may occur, and the interior of the vacuum envelope 13 may not be maintained in vacuum.

However, in this embodiment, since the first molding resin member 15 is formed in step P2 prior to step P4, it is possible to alleviate the influence of the stress. In other words, filling the space S with the first molding resin member 15 having rubber elasticity reinforces a connection portion between the glass container 16 and the metal member 17, where a stress concentration is likely to occur. Consequently, concentration of stress generated by curing of the second molding resin member 22 on the connection portion is suppressed, and consequently breakage of the glass container 16 and separation of the glass container 16 from the metal member 17 are prevented.

In addition, since concentration of stress on the connecting portion is suppressed in this manner, it is possible to increase the amount of the diluent added to the resin to be charged in step P4 to improve the work efficiency in the manufacture of the X-ray tube device.

In step P2 of forming the first molding resin member 15, since the gap G is formed between the resin charged into the space S and the fixing member 3, a large stress does not acts on the connection portion.

In addition, as shown in FIG. 1, in a case where the window 25 is formed by the partition wall 26, the second molding resin member 22 with the X-ray light shielding function can be used. In this case, the X-ray tube device can be used without an X-ray light shielding member formed of a harmful substance such as lead arranged outside the housing 2. Alternatively, even in a case where the X-ray light shielding member is arranged outside the housing 2, it is possible to reduce the amount of harmful substances such as lead used for the X-ray light shielding member.

In addition to the above description, this embodiment can provide various preferable effects.

Second Embodiment

The second embodiment will be described. An X-ray tube device referred to as a monoblock or a monotank is disclosed in the present embodiment. The same elements as those of the first embodiment are denoted by the same reference numerals, and redundant explanation may be omitted.

Figure 5:
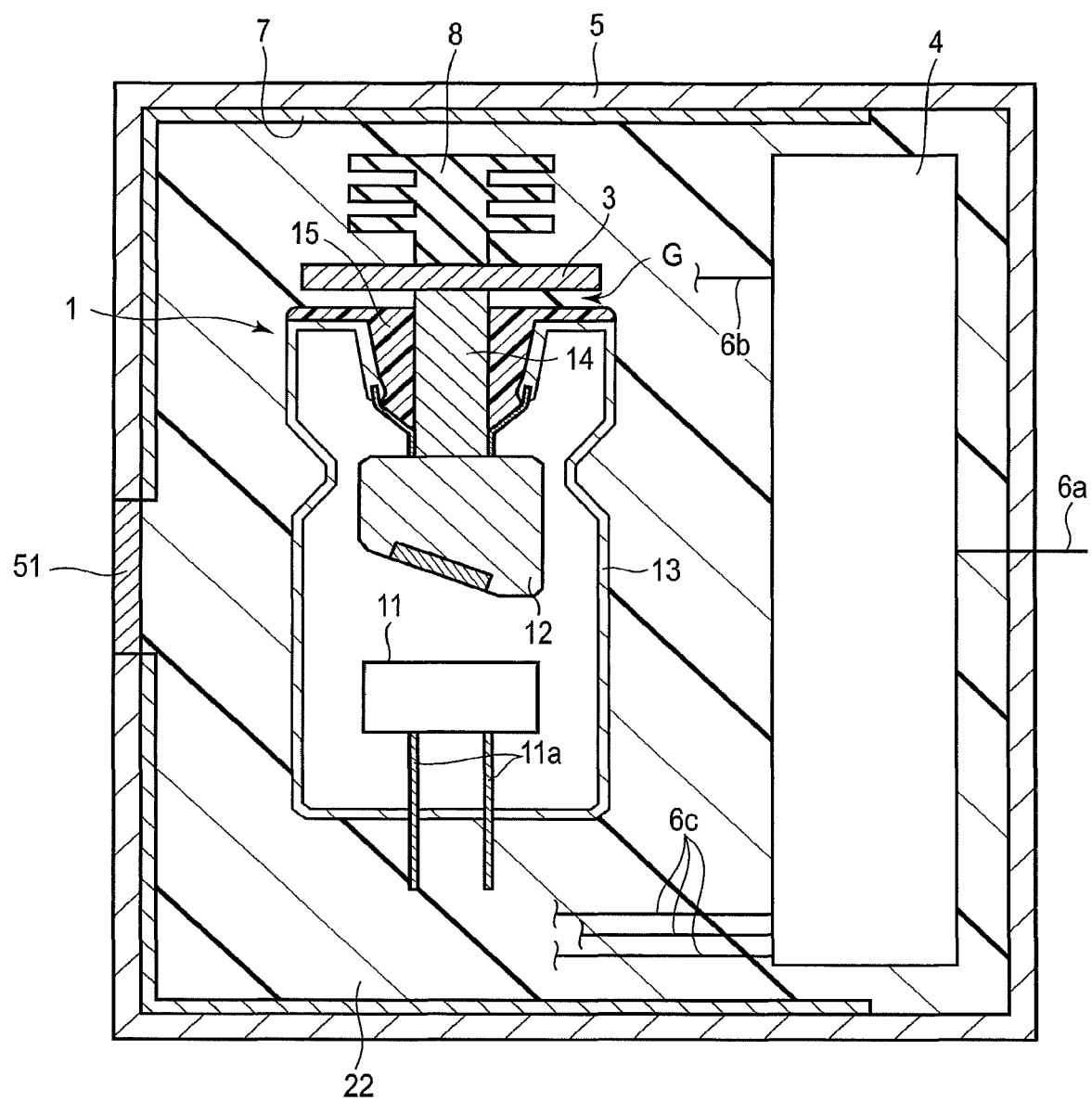
FIG. 5 is a cross-sectional view showing a schematic structure of an X-ray tube device according to a second embodiment.

FIG. 5 is a cross-sectional view showing a schematic structure of the X-ray tube device according to the present embodiment. The X-ray tube device includes the X-ray tube 1, the fixing member 3, a high voltage generator 4, a housing 5, a low voltage cable 6a, a high voltage cable 6b, a filament cable 6c, an X-ray shielding member 7, a radiator 8, and the second molding resin member 22. In the present embodiment, a high voltage is applied to the anode 12 of the X-ray tube 1.

The housing 5 houses the X-ray tube 1, the fixing member 3, the X-ray shielding member 7, the radiator 8, the second molding resin member 22, and the like. The X-rays from the X-ray tube 1 transmit an X-ray transmission window 51 of the housing 5 and are radiated outside the housing 5. In the X-ray transmission window 51, for example, a material with radiolucency is arranged. The housing 5 is made of, for example, a conductive material and is grounded. For example, a radiator plate having a large number of radiating fins may be attached to the outer wall of the housing 5.

The X-ray shielding member 7 is attached to the inner wall of the housing 5. The X-ray shielding member 7 opens corresponding to the X-ray transmission window 51. The radiator 8 is attached to the fixing member 3, and has a plurality of disk-shaped radiating fins. For example, the radiator 8 can be made of materials having good thermal conductivity but no electrical conductivity, such as aluminum nitride, beryllium oxide, diamond-like carbon, or the like.

The high voltage generator 4 includes, for example, a high voltage transformer and a filament transformer, and generates a high voltage from a low voltage alternating current input through a low voltage cable 6a. The high voltage generator 4 supplies a desired high voltage to the anode 12 through a high voltage cable 6b and supplies a required voltage to the cathode 11 through the filament cable 6c.

The second molding resin member 22 is charged into the housing 5. In other word, the second molding resin member 22 fills the space between the X-ray tube 1, the fixing member 3, the high voltage generator 4, the housing 5, and the radiator 8. The gap G is filled with the second molding resin member 22.

In the example of FIG. 5, the space between the X-ray tube 1 and the X-ray transmission window 51 is also filled with the second molding resin member 22. In a case where fine particles having an X-ray shielding function are mixed in the second molding resin member 22, the second molding resin member 22 may not be formed between the X-ray tube 1 and the X-ray transmission window 51. In a case where the X-ray shielding function is imparted to the second molding resin member 22, it is not necessary to provide the X-ray shielding member 7 or the amount of harmful substances such as lead used for the X-ray shielding member 7 can be reduced.

The flow of manufacturing such an X-ray tube device is substantially the same as that shown in FIG. 2. In other words, the X-ray tube 1 is manufactured (step P1), and the space S between the vacuum envelope 13 and the anode rod 14 is filled with the first molding resin member 15 (step P2). Thereafter, the X-ray tube 1 is attached to the fixing member 3 and the radiator 8, and the X-ray tube 1, the fixing member 3, the radiator 8 and the high voltage generator 4 are housed in the housing 5 (step P3). Then, the housing 5 is filled with the second molding resin member 22.

The configuration of the second embodiment described above can provide the same effects as that of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the X-ray tube device of the first embodiment, the housing 2 may not include the lid 21. Further, the housing 2 may be detached after the second molding resin member 22 has cured. Further, in this case, the housing 2 may be removed and the X-ray tube device 1 covered with the second molding resin member 22 may be housed in another housing.

Step P2 and step P3 shown in FIG. 2 can be interchanged. That is, after housing the X-ray tube 1 in the housing 2, the space S may be filled with the first molding resin member 15.

In the second embodiment, a device including the housing 2 shown in FIG. 1 may be housed in the housing 5. In this case, the inside of the housing 2 may be filled with the second molding resin member 22, and the inside of the housing 5 may be filled with the third molding resin member. The third molding resin member can includes a resin whose main component is, for example, a silicone resin as in the second molding resin member 22. Further, fine particles having the X-ray shielding function may be mixed in both of the second molding resin member 22 and the third molding resin member, or may be mixed only in one of them.

In each of the above embodiments, a high voltage is applied to the anode 12. However, it is also possible to provide a configuration in which the anode 12 is grounded and a high voltage is applied to the cathode 11. In a case where the anode 12 is grounded in this manner, the fixing member 3 can include a metal material such as aluminum or aluminum alloy.

What is claimed is:

1. An X-ray tube comprising:
   a cathode for emitting electrons;
   an anode having an anode target with which electrons emitted from the cathode collides to radiate X-rays;
   a glass container housing the cathode and the anode;
   an anode rod extending from the anode to an outside of the glass container;
   an annular metal member through which the anode rod is inserted, the annular metal member connecting the anode and the glass container to maintain an inside of the glass container in vacuum; and
   an electrically insulating molding resin member charged and cured in a space formed between the anode rod and outer surfaces of the glass container and the metal member, and comprising a surface exposed to outside air.

2. The X-ray tube of claim 1, wherein a main component of the molding resin member is a silicone resin.

3. The X-ray tube of claim 1 wherein,
   the glass container has a recessed portion recessed in a direction of the anode around the anode rod;
   the recessed portion has an opening on the anode side; and
   the metal member closes the opening.

4. The X-ray tube of claim 3, wherein
   the space is formed between the anode rod and the outer surfaces of the glass container and the metal member in the recessed portion, the space being annular, and
   the molding resin member is filled into the annular space.

5. The X-ray tube of claim 3, wherein the molding resin member is filled into the space and overflows the space, and extends on an outer surface of the glass container around the recessed portion.

6. An X-ray tube device comprising:
   an X-ray tube including,
   a cathode for emitting electrons,
   an anode having an anode target with which electrons emitted from the cathode collides to radiate X-rays,
   a glass container housing the cathode and the anode;
   an anode rod extending from the anode to an outside of the glass container,
   an annular metal member through which the anode rod is inserted, the annular metal member connecting the anode and the glass container to maintain an inside of the glass container in vacuum, and
   an electrically insulating first molding resin member charged and cured in a space formed between the anode rod and outer surfaces of the glass container and the metal member; and
   a fixing member attached to an end portion of the anode rod located outside the glass container and having a fixing surface forming a gap between the fixing member and the first molding resin member.

7. The X-ray tube device of claim 6, further comprising an electrically insulating and thermosetting second molding resin member, which is different from the first molding resin member and covers the X-ray tube and fills the gap between the first molding resin member and the fixing surface.

8. The X-ray tube device of claim 7, further comprising a housing which houses the X-ray tube and the fixing member, wherein the second molding resin member is filled in the housing.

9. The X-ray tube device of claim 8, further comprising a high voltage generator housed in the housing and supplying a high voltage to the X-ray tube,
   wherein the second molding resin member covers the high voltage generator.

10. The X-ray tube device of claim 7, wherein a main component of the first molding resin member is a silicone resin and a main component of the second molding resin member is a silicone resin.

11. The X-ray tube device of claim 10, wherein the main component of the first molding resin member and the main component of the second molding resin member are the same thermosetting silicone resin.

12. The X-ray tube device of claim 6, wherein
    the glass container has a recessed portion recessed in a direction of the anode around the anode rod;
    the recessed portion has an opening on the anode side; and
    the metal member closes the opening.

13. The X-ray tube device of claim 12, wherein
    the space is formed between the anode rod and the outer surfaces of the glass container and the metal member in the recessed portion, the space being annular, and
    the first molding resin member is filled in the annular space.

14. The X-ray tube device of claim 13, wherein the first molding resin member is filled in the space and overflows the space, and extends on an outer surface of the glass container around the recessed portion.

15. A method of manufacturing an X-ray tube device including an X-ray tube, the X-ray tube including,
    a cathode for emitting electrons,
    an anode having an anode target with which electrons emitted from the cathode collides to radiate X-rays,
    a glass container housing the cathode and the anode,
    an anode rod extending from the anode to an outside of the glass container, and
    an annular metal member through which the anode rod is inserted, the annular metal member connecting the anode and the glass container to maintain an inside of the glass container in vacuum,
    the method comprising:
    charging and curing an electrically insulating first molding resin member in a space formed between the anode rod and outer surfaces of the glass container and the metal member;
    attaching an end of the anode rod located outside the glass container to the fixing surface so that a gap is formed between the fixing surface of the fixing member and the first molding resin member;
    accommodating the X-ray tube in a housing; and
    charging and curing an electrically insulating and thermosetting second molding resin member in the housing, covering the X-ray tube with the second molding resin member, and filling the gap between the first molding resin member and the fixing surface with the second molding resin member.

16. The method of manufacturing the X-ray tube device of claim 15, wherein
    the accommodating includes accommodating a high-voltage generator electrically connected to the X-ray tube in the housing together with the X-ray tube, and
    the charging and curing includes charging and curing the second molding resin member in the housing, covering the X-ray tube and the high voltage generator with the second molding resin member, and filling the gap between the first molding resin member and the fixing surface with the second molding resin member.

17. The method of manufacturing the X-ray tube device of claim 15, wherein a main component of the first molding resin member is a silicone resin and a main component of the second molding resin member is a silicone resin.

18. The method of manufacturing the X-ray tube device of claim 17, wherein the main component of the first molding resin member and the main component of the second molding resin member are the same thermosetting silicone resin.

* * * * *